(12) United States Patent
Maryamchik

(10) Patent No.: US 9,192,889 B2
(45) Date of Patent: Nov. 24, 2015

(54) BOTTOM ASH INJECTION FOR ENHANCING SPRAY DRYER ABSORBER PERFORMANCE

(75) Inventor: Mikhail Maryamchik, Fairlawn, OH (US)

(73) Assignee: The Babcock & Wilcox Company, Barberton, OH (US)

(*) Notice: Subject to any disclaimer, the term of this patent is extended or adjusted under 35 U.S.C. 154(b) by 586 days.

(21) Appl. No.: 11/854,781

(22) Filed: Sep. 13, 2007

(65) Prior Publication Data

US 2009/0074629 A1 Mar. 19, 2009

(51) Int. Cl.
*B01D 53/50* (2006.01)
*F23C 10/10* (2006.01)
*B01D 53/60* (2006.01)
*F23J 15/00* (2006.01)
*F23J 15/02* (2006.01)

(52) U.S. Cl.
CPC .............. *B01D 53/505* (2013.01); *B01D 53/60* (2013.01); *F23C 10/10* (2013.01); *F23J 15/003* (2013.01); *F23J 15/02* (2013.01); *B01D 2257/2045* (2013.01); *B01D 2257/2047* (2013.01); *B01D 2257/302* (2013.01); *B01D 2257/404* (2013.01); *F23J 2219/60* (2013.01)

(58) Field of Classification Search
USPC .......................... 422/169, 171, 172, 139, 145; 423/244.07, 243.08
See application file for complete search history.

(56) References Cited

U.S. PATENT DOCUMENTS

| | | |
|---|---|---|
| 4,197,285 A | 4/1980 | Yang et al. |
| 4,309,393 A | 1/1982 | Nguyen |
| 4,324,770 A | 4/1982 | Bakke |
| 4,325,327 A | 4/1982 | Kantesaria et al. |
| 4,329,324 A | 5/1982 | Jones |
| 4,387,653 A | 6/1983 | Voss |
| 4,645,653 A | 2/1987 | Kimura |
| 4,756,892 A | 7/1988 | Kragh et al. |
| 4,867,955 A | 9/1989 | Johnson |
| 4,980,138 A | 12/1990 | Samish |
| 5,084,256 A | 1/1992 | McElroy et al. |
| 5,137,753 A | 8/1992 | Bland et al. |
| 5,171,552 A | 12/1992 | Miura et al. |
| 5,378,443 A | 1/1995 | Engstrom et al. |
| 5,382,418 A | 1/1995 | Thone et al. |
| 5,415,111 A | 5/1995 | Lewnard et al. |
| 5,480,624 A | 1/1996 | Kuivalainen |
| 5,551,357 A | 9/1996 | Wu et al. |
| 5,662,051 A | 9/1997 | Morin |
| 5,814,288 A | 9/1998 | Madden et al. |
| 6,146,607 A | 11/2000 | Lavely, Jr. |
| 6,290,921 B1 | 9/2001 | Kuivalainen et al. |
| 6,309,996 B1 | 10/2001 | Fan et al. |
| 6,520,099 B1 | 2/2003 | Furuya |
| 6,912,962 B2 | 7/2005 | Morin et al. |
| 2002/0197199 A1 | 12/2002 | Fan et al. |
| 2003/0151023 A1 | 8/2003 | Trass et al. |
| 2005/0287058 A1 | 12/2005 | Kinnunen |

OTHER PUBLICATIONS

Curran, R.A., et al., "Cold-Side Desulfurization by Humidification of Fly Ash in CFB Boilers," Fluidized Bed Combustion—vol. 2, ASME, United States, 1995, pp. 851-856.

*Primary Examiner* — Lessanework Seifu

(74) *Attorney, Agent, or Firm* — Eric Marich

(57) ABSTRACT

Alkali-containing bottom ash produced by a circulating fluidized bed (CFB) boiler is recycled to downstream spray dryer absorption (SDA) apparatus to more fully utilize the unused reagent present in the ash, and/or to reduce the amount of reagent used while not increasing $NO_x$ generation.

8 Claims, 1 Drawing Sheet

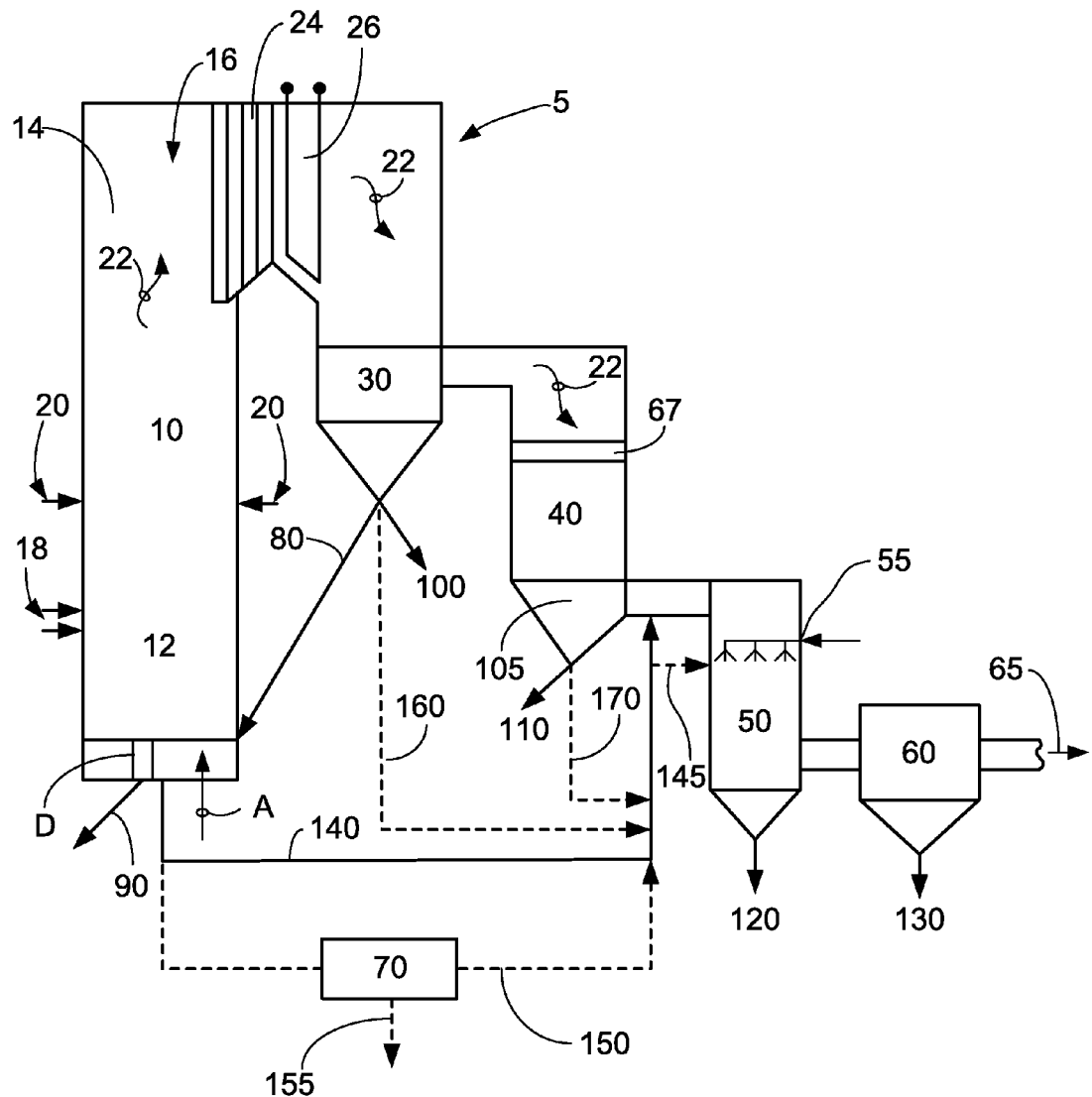

BOTTOM ASH INJECTION FOR ENHANCING SPRAY DRYER ABSORBER PERFORMANCE

FIELD AND BACKGROUND OF THE INVENTION

1. Field of the Invention

The present invention relates, in general, to the field of circulating fluidized bed (CFB) boilers used to produce steam for industrial processes or electric power generation and, more particularly, to systems comprising such CFB boilers in combination with spray dryer absorbers (SDAs) used to remove acid gas compounds from gases produced during the combustion of fossil fuels in such boilers.

2. Description of the Related Art

Electric power generating plants and other industries that combust fossil fuels (e.g., coal, oil, petroleum coke, and/or waste materials) create various contaminants that include, among other things, acid gases (such as sulfur oxides) and other unwanted and/or undesirable chemical compounds in the flue gas produced during combustion.

In the 1970s, fluidized-bed combustion technology was first applied to large-scale utility boiler units to explore new ways of burning solid fuels, especially high-sulfur coal, in an environmentally acceptable and efficient manner. In concept, fluidized beds burn fuel in an air-suspended mass (or bed) of particles. By controlling bed temperature and using reagents such as limestone as bed material, emissions of nitrogen oxides ($NO_x$) and sulfur dioxide ($SO_2$) can be better controlled. Additional benefits of fluidized-bed combustion include wide fuel flexibility and the ability to combust fuels such as biomass or waste fuels, which are difficult to burn in conventional systems because of their low heating value, low volatile matter, high moisture content or other challenging characteristics. This technology is now used in a variety of industrial and utility boiler applications. For a better understanding of the various types of fluidized bed boilers the reader is referred to *STEAM its generation and use*, 41$^{st}$ Ed., Kitto and Stultz, eds., Copyright© 2005, The Babcock & Wilcox Company, particularly Chapter 17, the text of which is hereby incorporated by reference as though fully set forth herein.

One type of fluidized bed boiler is known as a circulating fluidized bed boiler, or CFB. CFB boilers are widely used for combusting sulfur-containing fuels since the typical CFB furnace gas temperature range allows for effective use of limestone and other alkali-containing sorbents injected into the furnace for in-furnace sulfur capture. The most commonly utilized alkali is calcium oxide, CaO, (a.k.a. lime) which reacts with sulfur dioxide in the flue gas producing calcium sulfate:

$$CaO+SO_2+\tfrac{1}{2}O_2 \rightarrow CaSO_4$$

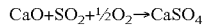

CFB boilers typically allow achieving a percentage of sulfur capture in the range of low-to-medium 90% without use of additional emission control equipment. Some fuels, e.g. oil shale, may even contain a sufficient amount of alkali that will allow, when fired at typical CFB furnace temperatures, a similar percentage of sulfur capture without sorbent injection.

Even though CFB boilers are quite efficient at reducing the amount of sulfur dioxides present in the flue gases, there are situations where even further sulfur oxide reductions, particularly sulfur dioxide, are required. When the required percentage of sulfur capture reaches the high 90% range, achieving this solely in the CFB furnace or reactor becomes either impossible or uneconomical. In these cases, post-combustion equipment is often required.

One of the most common methods for reducing sulfur oxides in flue gases is through a spray drying chemical absorption process, also known as dry scrubbing, wherein an aqueous alkaline solution or slurry is finely atomized (via, for example, mechanical, dual fluid, or rotary atomizers), and sprayed into the hot flue gas to remove the contaminants. For a better understanding of spray drying chemical absorption processes, or dry scrubbing, the reader is referred to *STEAM its generation and use*, 41$^{st}$ Ed., Kitto and Stultz, eds., Copyright© 2005, The Babcock & Wilcox Company, particularly Chapter 35, pages 35-12 through 35-18, the text of which is hereby incorporated by reference as though fully set forth herein.

Spray dry absorption (SDA) reflects the primary reaction mechanisms involved in the process: drying alkaline reagent slurry atomized into fine droplets in the hot flue gas stream and absorption of $SO_2$ and other acid gases from the gas stream. The process is also called semi-dry scrubbing to distinguish it from injection of a dry solid reagent into the flue gas.

In a typical boiler installation arrangement, the SDA is positioned before the dust collector. Flue gases leaving the last heat trap (typically, air heater) at a temperature of 250° F. to 350° F. (121° C. to 177° C.) enter the spray chamber where the reagent slurry is sprayed into the gas stream, cooling the gas to 150° F. to 170° F. (66° C. to 77° C.). An electrostatic precipitator (ESP) or fabric filter (baghouse) can be used to collect the reagent, flyash and reaction products. Baghouses are the dominant selection for U.S. SDA installations (over 90%) and provide for lower reagent consumption to achieve similar overall system $SO_2$ emissions reductions.

$SO_2$ absorption takes place primarily while the water is evaporating and the flue gas is adiabatically cooled by the spray. Reagent stoichiometry and approach temperature are the two primary variables that control the scrubber's $SO_2$ removal efficiency. The stoichiometry is the molar ratio of the reagent consumed to either the inlet $SO_2$ or the quantity of $SO_2$ removed in the process. Depending upon available reagent and acid gas content in the flue gases, the stoichiometry can vary widely; e.g., from about 1 to more than 10. The difference between the temperature of the flue gas leaving the dry scrubber and the adiabatic saturation temperature is known as the approach temperature. Flue gas saturation temperatures are typically in the range of 115° F. to 125° F. (46° C. to 52° C.) for low moisture bituminous coals and 125° F. to 135° F. (52° C. to 57° C.) for high moisture subbituminous coals or lignites. The optimal conditions for $SO_2$ absorption must be balanced with practical drying considerations.

The predominant reagent used in dry scrubbers is lime slurry produced by slaking a high-calcium pebble lime. The slaking process can use a ball mill or a simple detention slaker. SDA systems that use only lime slurry as the reagent are known as single pass systems. Some of the lime remains unreacted following an initial pass through the spray chamber and is potentially available for further $SO_2$ collection. Solids collected in the ESP or baghouse may be mixed with water and reinjected in the spray chamber of the SDA along with the SDA reagent.

If the fuel sulfur content is low and/or the fuel contains enough alkalis, as is known to be the case for certain types of coal and oil shale, the ash particles themselves could serve as a source of reagent in the SDA. Typically, the alkali in fuel that can produce sufficient sulfur capture is calcium carbonate ($CaCO_3$).

Another example of ash particles being capable of serving as a reagent source in the SDA for capturing $SO_2$ is the ash from the circulating fluidized bed (CFB) boiler. This type of boiler typically utilizes limestone, which has as its predominant component calcium carbonate, fed to the furnace for in-furnace capture of $SO_2$ generated in the combustion process.

Whether part of the fuel or limestone, calcium carbonate in the furnace undergoes calcination, i.e. releases gaseous carbon dioxide and yields a solid calcium oxide, CaO, also known as lime:

$$CaCO_3 \rightarrow CaO + CO_2$$

The CaO reacts with $SO_2$ in the furnace gases thus producing calcium sulfate:

$$CaO + SO_2 + \tfrac{1}{2}O_2 \rightarrow CaSO_4$$

Calcium sulfate generated in the reaction covers the surface of the particle with a shell impenetrable for $SO_2$ thus stopping the reaction and rendering any CaO in its core unutilized.

This unutilized alkali is contained in the ash streams discharged from the CFB boiler or reactor. There are typically two major ash streams discharged from the CFB boiler: fly ash, i.e., fine particles carried with the flue gas leaving the CFB boiler, and bottom ash, i.e., coarser particles discharged at the furnace bottom.

In order to react with $SO_2$ in the SDA, the ash particles containing alkalis have to be reactivated. This can be done by wetting them with water spray. In such a case, instead of spraying lime slurry, water will be sprayed into the flue gas in the SDA. The humidification of the particles facilitates ionic reactions of the unutilized alkali with remaining sulfur dioxide in the flue gas thus providing for sulfur capture. If the alkali slurry is injected, it will provide for sulfur capture in addition to what can be achieved by humidifying fly ash particles. This, however, will incur expenses associated with preparation and injecting the alkali slurry. Use of fly ash humidification for sulfur capture is described in R. A. Curran et al., "Cold-Side Desulfurization by Humidification of Fly Ash in CFB Boilers", Proceedings of the 13$^{th}$ International Conference on Fluidized Bed Combustion, 1995.

A typical SDA process is as follows. The flue gas enters a spray dryer absorber where the gas stream is cooled by the reagent slurry or water spray. The mixture then passes on to the baghouse for removal of particulate before entering the induced draft fan and passing up the stack. If lime slurry is used as a reagent, pebble lime (CaO) is mixed with water at a controlled rate to maintain a high slaking temperature that helps generate fine hydrated lime ($Ca(OH)_2$) particles with high surface area in the hydrated lime slurry (18 to 25% solids). A portion of the flyash, unreacted lime and reaction products collected in the baghouse may be mixed with water and returned to the SDA as a high solids (35 to 45% typical) slurry. The remaining solids are directed to a storage silo for byproduct utilization or disposal. The fresh lime and recycle slurries (if any) are combined just prior to the atomizer(s) to enable fast response to changes in gas flow, inlet $SO_2$ concentrations, and $SO_2$ emissions as well as to minimize the potential for scaling.

$SO_2$ absorption in an SDA occurs in the individual slurry droplets or particles of wetted ash. Most of the reactions take place in the aqueous phase; the $SO_2$ and the alkaline constituents dissolve into the liquid phase where ionic reactions produce relatively insoluble products. The reaction path can be described as follows:

$$SO_2(g) \rightleftharpoons SO_2(aq) \tag{a}$$

$$Ca(OH)_2(s) \rightarrow Ca^{+2} + 2OH^- \tag{b}$$

$$SO_2(aq) + H_2O \rightleftharpoons HSO_3^- + H^+ \tag{c}$$

$$SO_2(aq) + OH^- \rightleftharpoons HSO_3^- \tag{d}$$

$$OH^- + H^+ \rightleftharpoons H_2O \tag{e}$$

$$HSO_3^- + OH^- \rightleftharpoons SO_3^{-2} + H_2O \tag{f}$$

$$Ca^{+2} + SO_3^{-2} + \tfrac{1}{2}H_2O \rightarrow CaSO_3 \cdot \tfrac{1}{2}H_2O(s) \tag{g}$$

The above reactions generally describe activity that takes place as heat transfer from the flue gas to the slurry droplet or wetted ash particle causes evaporation of the slurry droplet or the water from the surface of the wetted ash particle. Rapid $SO_2$ absorption occurs when liquid water is present. The drying rate can be slowed down to prolong this period of efficient $SO_2$ removal by adding deliquescent salts to the reagent feed slurry. Salts such as calcium chloride also increase the equilibrium moisture content of the end product. However, since the use of these additives alters the drying performance of the system, the operating conditions must be adjusted (generally increasing the approach temperature) to provide for good long-term operability of the SDA and the ash handling system. Ammonia injection upstream of a dry scrubber also increases $SO_2$ removal performance. $SO_2$ absorption continues at a slower rate by reaction with the solids in the downstream particulate collector.

An SDA/baghouse combination also provides efficient control of HCl, HF and $SO_3$ emissions by the summary reactions of:

$$Ca(OH)_2 + 2HCl \rightarrow CaCl_2 + 2H_2O \tag{1}$$

$$Ca(OH)_2 + 2HF \rightarrow CaF_2 + 2H_2O \tag{2}$$

$$Ca(OH)_2 + SO_3 \rightarrow CaSO_4 + H_2O \tag{3}$$

Proper accounting of the reagent consumption must include these side reactions, in addition to the $SO_2$ removed in the process.

Spray dryer absorbers (SDAs) can be a separate structure, or they can be an integrated part of the flue that precedes one or more particle collection devices, such as one or more baghouses or electrostatic precipitators.

Humidifying alkali-containing fly ash particles in the SDA allows further (after the CFB furnace) $SO_2$ reduction in the flue gas and/or reduced consumption of the reagent, e.g., limestone fed to the furnace and/or lime slurry fed to the SDA. This, however, does not improve utilization of alkali contained in the bottom ash. The latter is addressed in U.S. Patent Application No. US2005/0287058 that teaches recycling part or all of the bottom ash to the CFB furnace. While improving utilization of alkali in the bottom ash, however, this method will cause an increase of $NO_x$ generation in the furnace since CaO, a predominant alkali component in the CFB ash, catalyzes oxidation of nitrogen released with fuel volatiles in the furnace.

Thus, there is a need in the art for a device and/or method for reducing the $SO_2$ emissions and/or amount of reagent necessary for its reduction while not causing an increase in $NO_x$ generation.

SUMMARY OF THE INVENTION

A substantial amount of unutilized alkali leaves the CFB boiler with the bottom ash. This results in reduced sulfur capture potential of the available alkali and/or additional expenses for alkali-containing sorbent. As will be explained in greater detail below, the present invention recycles alkali-containing ash from the reactor to one or more SDAs to more fully utilize the unused reagent present in the ash, and/or to reduce the amount of reagent used in the SDA while not increasing $NO_x$ generation.

By injecting the bottom ash in the SDA in combination with spraying a humidifying agent; e.g., lime slurry or water, the present invention seeks to increase sulfur capture by increased utilization of this source of alkali-containing sorbent. In this fashion, the bottom ash particles are also reactivated and alkali within the particles becomes available for sulfur capture. A preferred location for injecting the bottom ash is upstream of the location where the humidifying agent is introduced into the gas stream. This reduces the potential for growing deposits in the SDA and improves mixing of the humidifying agent and the bottom ash. However, if required due to equipment arrangement constraints, the bottom ash can also be injected concurrently with or downstream of the spraying the humidifying agent.

If some portion of the bottom ash, e.g. coarser size fractions, is known to have little or no alkali available for sulfur capture, this portion may be not injected. To further improve the efficiency of the bottom ash alkali utilization, the ash may be ground prior to injecting. Grinding increases the reaction surface area of the bottom ash while mechanically breaking the sulfate shell around the particles. Both measures increase the reaction rate between alkali and sulfur dioxide in the gas thus improving sulfur capture in SDA. In order to reduce power consumption for grinding bottom ash, only part of it, e.g. the coarsest fractions, could be ground.

The primary application of the present invention is envisioned to be installations where CFB boilers which produce bottom ash are provided with downstream SDA devices. However, the present invention may also be used where the combustor is other than a CFB, or even a fluidized bed, so long as there is a source of bottom ash that contains alkali and which could be used for sulfur capture in the SDA located downstream of the combustor. It should also be noted that sulfur capture occurs by means of reducing not only $SO_2$ but other sulfur compounds such as $SO_3$ and $H_2SO_4$. Alkali in the SDA also captures non-sulfurous hazardous compounds such as hydrogen chloride (HCl). Therefore, injecting bottom ash at the SDA improves control of multiple pollutants.

Utilization of bottom ash according to the present invention may have additional benefits. For example, by reducing the amount of unutilized alkali in the combustor ash, there is reduced potential for leaching for this ash if disposed at a landfill. It can also simplify the plant's ash disposal system by combining two major effluent ash streams into one; i.e. fly ash, thus eliminating the need for bottom ash storage and disposal equipment.

Accordingly, one aspect of the present invention is drawn to a system for reducing the concentration of an acid compound in a gas. The system comprises a reactor producing at least gas containing at least one acid compound, and bottom ash containing alkali, the bottom ash being discharged separately from the gas. A spray dryer absorber is provided for receiving the gas. Means are provided for introducing the bottom ash into the gas downstream of the reactor so that the alkali is available in the spray dryer absorber for reacting with the at least one acid compound, together with means for introducing a humidifying agent into the spray dryer absorber to facilitate the reaction of the alkali with the at least one acid compound to reduce its concentration in the gas.

The present invention thus provides an improved arrangement of equipment and a method of operating spray dryer absorbers that are used to remove acidic compounds from combustion flue gases produced by a circulating fluidized bed (CFB) boiler. The humidifying agent can comprise at least one of water and alkali-containing slurry. The bottom ash may be introduced into the gas upstream of and/or within the gas in the spray dryer absorber. Various acid gas compounds which may be removed by the system of the present invention include sulfur dioxide, sulfur trioxide, hydrochloric acid, sulfuric acid, hydrofluoric acid or mixtures thereof. The source of the bottom ash may be that which is discharged from the reactor, or from at least one of the stages of a multistage solids collection system provided for the reactor.

The various features of novelty which characterize the invention are pointed out with particularity in the claims annexed to and forming a part of this disclosure. For a better understanding of the invention, its operating advantages and the specific benefits attained by its uses, reference is made to the accompanying drawings and descriptive matter in which preferred embodiments of the invention are illustrated.

BRIEF DESCRIPTION OF THE DRAWINGS

The sole FIGURE is a schematic illustration of a preferred embodiment of the invention as applied to an installation having a circulating fluidized bed boiler.

DESCRIPTION OF THE PREFERRED EMBODIMENT

The present invention generally relates to a circulating fluidized bed (CFB) boiler or reactor installation which produces an acidic gas and which utilizes a spray dryer absorber (SDA) downstream to reduce the concentration of at least one acid compound in the gas. While the present invention is directed particularly to boilers or steam generators which employ CFB boilers or reactors as the means by which the heat is produced, it is understood that the present invention can readily be employed in a different kind of CFB reactor. For example, the invention could be applied in a reactor that is employed for chemical reactions other than a combustion process, or where a gas/solids mixture from a combustion process occurring elsewhere is provided to the reactor for further processing, or where the reactor merely provides an enclosure wherein particles or solids are entrained in a gas that is not necessarily a byproduct of a combustion process.

Typical combustion processes produce flue gas which contains at least one acid compound, and other pollutants such as $NO_x$, $SO_x$ and ash particulates. For the purposes of the present disclosure, fly ash will be used to refer to ash which is entrained in and conveyed by the flue gas into the SDA, and bottom ash will be used to refer to ash which has been removed from the flue gas anywhere in the system upstream of the SDA.

Referring to the sole FIGURE, the CFB boiler 5 has a furnace or reactor 10 typically defined by fluid cooled enclosure walls having a membraned tube wall construction. The reactor 10 has a lower portion 12, an upper portion 14, and a furnace exit opening 16. Carbonaceous fuel, such as coal, and sorbent, such as limestone, schematically indicated at 18, are provided to the lower portion 12 in a regulated and metered fashion by any conventional means known to those skilled in the art. Primary air A for fluidization is provided to the lower portion 12. Bed drain D removes bottom ash 90 and other debris from the lower portion 12 as required, and overfire air supply ports 20 supply the balance of the air needed for combustion.

A flue gas/solids mixture 22 produced by the CFB combustion process and which contains at least one acid compound flows upwardly through the reactor 10 from the lower portion 12 to the upper portion 14, transferring a portion of the heat contained therein to the fluid cooled enclosure walls to generate steam. A first stage of particle collection 24 is provided at the furnace exit opening 16, and may advantageously comprise an array of U-beam impact type particle separators. The U-beams collect some of the particles entrained in the flue gas/solids mixture 22 and cause them to free fall down towards the bottom portion 12 of the reactor 10.

The flue gas/solids mixture 22, from which some particles have been removed by the first stage particle collection 24, pass across heat transfer surface 26, such as superheater and/or reheater surface, and continues through the CFB boiler 5 and passes through a second stage of particle collection, this time in the form of a multicyclone dust collector or MDC 30. The flue gas/solids mixture 22 continues through the CFB boiler 5, through additional heat transfer devices such as an economizer and/or air heater 40 which further extracts heat from the flue gas/solids mixture 22, and thence to one or more spray dryer absorber(s) or SDA(s) 50 for removal of acid compounds from the flue gas/solids mixture 22. A humidifying agent, such as water and/or an alkali-containing slurry 55, is injected into the SDA 50 to facilitate the reaction of alkali within the SDA with the at least one acid compound in the flue gas 22 to reduce the concentration of the acid compound in the gas 22. The flue gas 22 is then conveyed to final particle collection means 60 in the form of a baghouse (fabric filter) or electrostatic precipitator (ESP). The substantially clean flue gas 65 may then be discharged to the atmosphere via a stack (not shown).

As will be appreciated by those of skill in the art, the system of the FIGURE could include various other items and/or systems, such as a selective catalyst reduction system 67, etc. Also, the at least one acid compound which may be present in the gas 22 can comprise one or more of sulfur dioxide, sulfur trioxide, hydrochloric acid, sulfuric acid, hydrofluoric acid or mixtures thereof.

Referring again to the FIGURE, the bed drain D removes bottom ash and other debris from the lower portion 12 as required. As indicated above, the bottom ash 90 from a CFB boiler 5 may contain a substantial amount of unutilized alkali. Typically, the bottom ash 90 is discarded or sent to disposal. However, in accordance with the present invention, this alkali-containing bottom ash 90 from the reactor is recycled to one or more SDAs 50 to more fully utilize the unused reagent present in the bottom ash 90, and/or to reduce the amount of reagent used in the SDA 50 and/or boiler 5.

The bottom ash 90 may be introduced back into the flue gas 22 at a location downstream of the reactor 10 via line 140 so that the alkali in the bottom ash 90 is available in the SDA 50 for reacting with the at least one acid gas compound in the gas. One location for this introduction of the bottom ash 90 may be upstream of the SDA 50. Another location, in place of or in addition to this upstream location, may be within the SDA 50, schematically indicated at 145.

If some size fractions of the bottom ash 90, e.g. coarser size fractions, are known to have little or no alkali available for sulfur capture, this part of the ash may be rejected by screening. To further improve the efficiency of the bottom ash 90 alkali utilization, the bottom ash 90 may be ground, prior to injecting. Device 70 can thus be a screen, crusher or combination thereof. Grinding increases the reaction surface area of the bottom ash 90 while mechanically breaking the sulfate shell around the particles. Both measures increase the reaction rate between alkali and sulfur dioxide or other acid compounds in the gas 22 thus improving sulfur capture in SDA 50. In order to reduce power consumption for grinding the bottom ash 90, only part of it, e.g. the coarsest fractions, could be ground. If grinding of the bottom ash 90 is performed, the ground bottom ash is conveyed along the path indicated by dotted line 150, while unsuitable ash is discarded at 155.

The FIGURE also illustrates other aspects of the present invention which involve the utilization of ash for its alkali content which may be collected by the aforementioned multistage solids collection system; i.e., ash particles which were collected and removed from the flue gas/solids particles by the U-beams 24 and MDC 30, as well as that collected by hoppers located below the air heater 40. In particular, ash 100 collected by the MDC 30 which is typically returned to the lower portion 12 of the reactor 10 via line 80 may alternatively be reintroduced into the flue gas 22 via line 160. Similarly, ash 110 collected in a hopper 105 located below the air heater 40 which is typically discarded may alternatively be reintroduced into the flue gas 22 via line 170. As is the case of bottom ash 90, ash 100 and 110 may also be introduced either upstream of or within the SDA 50.

In any of these embodiments, it is preferred that the bottom ash is not wetted in order to prevent cementing or agglomeration which would potentially impede conveying the bottom ash to its intended destination. Thus, pneumatic or mechanical conveying means are preferred and the details of the design of such systems are known to those skilled in the art.

Although the invention has been described in detail with particular reference to certain embodiments detailed herein, other embodiments can achieve the same results. For example, the present invention may be applied in new construction involving SDAs, or to the repair, replacement, and modification or retrofitting of existing SDAs. Variations and modifications of the present invention will be obvious to those skilled in the art and the present invention is intended to cover in the appended claims all such modifications and equivalents covered by the scope of the following claims.

I claim:

1. A system for reducing the acid gas concentration in a combustion flue gas and/or reducing acid gas sorbent consumption while not increasing $NO_x$ generation, comprising:
    a reactor for producing (i) combustion flue gas containing at least one acid compound, the at least one acid compound including at least one of sulfur dioxide, sulfur trioxide, hydrochloric acid, sulfuric acid, hydrofluoric acid or mixtures thereof, and (ii) bottom ash containing alkali, the bottom ash being discharged separately from the combustion flue gas, the reactor further comprising fluid cooled enclosure walls, the walls having a membrane tube wall construction, the reactor having a lower portion, an upper portion, and an exit opening;
    a first particle collection area proximate the exit opening;
    heat transfer surface proximate the first particle collection area;
    a second particle collection area proximate the heat transfer surface;
    an economizer proximate to said second particle collection area;
    a spray dryer absorber, proximate to said economizer, for receiving the combustion flue gas;
    means for introducing the bottom ash into the combustion flue gas downstream of the reactor at a location upstream of and/or within the spray dryer absorber so that the alkali is available in the spray dryer absorber for reacting with the at least one acid compound; and
    means for introducing a humidifying agent into the spray dryer absorber to facilitate the reaction of the alkali with the at least one acid compound to reduce the acid gas concentration in the combustion flue gas, the humidifying agent including at least one of water and an alkali-containing slurry.

2. The system of claim 1, wherein the reactor is a fluidized bed boiler.

3. The system of claim 2, wherein the reactor is a circulating fluidized bed boiler.

4. The system of claim 1, further comprising a bed drain secured below the lower portion and adapted to receive debris from the lower portion.

5. The system according to claim 1, wherein said heat transfer surface is a superheater.

6. The system according to claim 1, wherein the first particle collection area comprises a plurality of U-beam particle separators.

7. The system according to claim 1, wherein the second particle collection area comprises a multicyclone dust collector.

8. A system for reducing the acid gas concentration in a combustion flue gas and/or reducing acid gas sorbent consumption while not increasing $NO_x$ generation, comprising:
 a reactor for producing (i) combustion flue gas containing at least one acid compound, the at least one acid compound including at least one of sulfur dioxide, sulfur trioxide, hydrochloric acid, sulfuric acid, hydrofluoric acid or mixtures thereof, and (ii) bottom ash containing alkali, the bottom ash being discharged separately from the combustion flue gas, the reactor further comprising fluid cooled enclosure walls, the walls having a membrane tube wall construction, the reactor having a lower portion, an upper portion, and an exit opening;
 a first particle collection area proximate the exit opening, the first particle collection area comprising a plurality of U-beam particle separators;
 heat transfer surface proximate the first particle collection area;
 a second particle collection area proximate the heat transfer surface, the second particle collection area comprising a multicyclone dust collector;
 an economizer proximate to said second particle collection area;
 a spray dryer absorber, proximate to said economizer, for receiving the combustion flue gas;
 a particle collection means proximate said spray dryer absorber;
 means for introducing the bottom ash into the combustion flue gas downstream of the reactor at a location upstream of and/or within the spray dryer absorber so that the alkali is available in the spray dryer absorber for reacting with the at least one acid compound; and
 means for introducing a humidifying agent into the spray dryer absorber to facilitate the reaction of the alkali with the at least one acid compound to reduce the acid gas concentration in the combustion flue gas, the humidifying agent including at least one of water and an alkali-containing slurry.

* * * * *